(12) United States Patent
Han et al.

(10) Patent No.: US 12,311,345 B2
(45) Date of Patent: May 27, 2025

(54) CATALYST-SUPPORTED ORGANIC-INORGANIC HYBRID COMPOSITE PARTICLES CAPABLE OF REGULATING POLYURETHANE REACTION RATE, AND PREPARATION METHOD THEREFOR

(71) Applicant: AGENCY FOR DEFENSE DEVELOPMENT, Daejeon (KR)

(72) Inventors: Min-Gu Han, Daejeon (KR);
Keun-Deuk Lee, Daejeon (KR);
Ki-Bong Lee, Daejeon (KR);
Joo-Seung Chae, Daejeon (KR);
Ha-neul Park, Daejeon (KR);
Ju-Young Kim, Samcheok-si (KR);
Ho-Young Jung, Gwangju (KR);
Na-Hye Kim, Samcheok-si (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 582 days.

(21) Appl. No.: 17/428,789

(22) PCT Filed: Feb. 7, 2020

(86) PCT No.: PCT/KR2020/001730
§ 371 (c)(1),
(2) Date: Aug. 5, 2021

(87) PCT Pub. No.: WO2020/162695
PCT Pub. Date: Aug. 13, 2020

(65) Prior Publication Data
US 2022/0118433 A1    Apr. 21, 2022

(30) Foreign Application Priority Data
Feb. 8, 2019    (KR) .................. 10-2019-0014951

(51) Int. Cl.
*B01J 31/12* (2006.01)
*B01J 31/06* (2006.01)
*C08G 18/83* (2006.01)

(52) U.S. Cl.
CPC .............. *B01J 31/12* (2013.01); *B01J 31/06* (2013.01); *C08G 18/837* (2013.01)

(58) Field of Classification Search
CPC ... B01J 23/04; B01J 23/06; B01J 23/14; B01J 23/18; B01J 23/745; B01J 2531/42;
(Continued)

(56) References Cited

U.S. PATENT DOCUMENTS 3,136,731 A    6/1964    Piechota et al.

FOREIGN PATENT DOCUMENTS

| CA | 2641773 C | * | 4/2013 | ......... B32B 17/1077 |
| CN | 108097311 A | | 6/2018 | |

(Continued)

OTHER PUBLICATIONS

Kim et al. KR20150117719A English Translation (Year: 2015).*
(Continued)

*Primary Examiner* — Sally A Merkling
*Assistant Examiner* — Jordan W Taylor
(74) *Attorney, Agent, or Firm* — LRK PATENT LAW FIRM

(57) ABSTRACT

The present invention relates to a catalyst-supporting organic-inorganic hybrid composite particle, and more particularly, to a technique of adjusting a desired pot life and curing speed by preparing a catalyst-supporting organic-inorganic hybrid composite particle by adding a catalyst for polyurethane reaction to a catalyst-supporting particle prepared by stirring an alkoxy silane-functionalized polyurethane precursor and the tetraethyl orthosilicate for a certain period of time and mixing them, and adjusting an initiation
(Continued)

S100

PREPARE MIXTURE BY MIXING ALKOXY SILANE-FUNCTIONALIZED POLYURETHANE PRECURSOR (AFPP) WITH TETRAETHYL ORTHOSILICATE (TEOS) — S110

PREPARE CATALYST-SUPPORTING PARTICLE BY ADDING DROPWISE AQUEOUS ACID SOLUTION INTO MIXTURE AND ALLOWING REACTION TO TAKE PLACE — S120 rate for polyurethane polymerization through the prepared catalyst-supporting organic-inorganic hybrid composite particle.

4 Claims, 4 Drawing Sheets

(58) Field of Classification Search
CPC ........ B01J 27/20; B01J 31/0237; B01J 31/04; B01J 31/06; B01J 31/069; B01J 31/12; B01J 31/122; B01J 31/2234; B01J 37/0201; B01J 37/0203; C06B 45/10; C08G 18/16; C08G 18/246; C08G 18/4812; C08G 18/4829; C08G 18/4833; C08G 18/7621; C08G 18/837
See application file for complete search history.

(56) References Cited

FOREIGN PATENT DOCUMENTS

| KR | 10-2003-0038585 A | 5/2003 |
|---|---|---|
| KR | 10-2011-0024499 A | 3/2011 |
| KR | 10-1142754 B1 | 5/2012 |
| KR | 10-2012-0106357 A | 9/2012 |
| KR | 10-2015-0117719 A | 10/2015 |
| KR | 20150117719 A * | 10/2015 |

OTHER PUBLICATIONS

Cho et al. European Polymer Journal, 2004, 40, 1343-1348 (Year: 2004).*
Heck et al. (Int. J. Adhesion and Adhesives 2015, 58, 13-20) (Year: 2015).*
Sardon et al. (Progress in Organic Coatings 2014, 77, 1436-1442) (Year: 2014).*
Zhai et al. (J. Appl. Polym. Sci. 2013) (Year: 2013).*
Lee, Dae-Gon et al. "Catalyst-Supporting Organic-Inorganic Hybrid Composite Particle Using Alkoxysilane-Functionalized Amphiphilic Polymer Precursor", Abstracts Presented at the 60th KSIEC Meeting, May 2018, IP-181, p. 177.
Search Report, mailed on Aug. 10, 2020, for International Application No. PCT/KR2020/001730.
Written Opinion, mailed on Aug. 10, 2020, for International Application No. PCT/KR2020/001730.
Search Report dated Jun. 30, 2022, in European Patent Appl'n No. 20752729.2.

* cited by examiner

S100

CATALYST-SUPPORTED ORGANIC-INORGANIC HYBRID COMPOSITE PARTICLES CAPABLE OF REGULATING POLYURETHANE REACTION RATE, AND PREPARATION METHOD THEREFOR

CROSS-REFERENCE TO RELATED APPLICATIONS

The present application is a U.S. National Phase entry from International Application No. PCT/KR2020/001730, filed on Feb. 7, 2020, which claims priority to Korean Patent Application No. 10-2019-0014951, filed on Feb. 8, 2019, the disclosure of which is incorporated by reference herein in their entirety.

FIELD

The present invention relates to a plastic bonded explosive (PBX), and more particularly, to a polyurethane reaction catalyst-supporting organic-inorganic hybrid composite particle capable of adjusting an initiation rate for polyurethane polymerization and providing a desired pot life and curing rate, and a method of preparing the same.

BACKGROUND

A plastic bonded explosive (PBX) is a composite material in which a granular explosive and a polymer material are combined as a major component, where the polymer material imparts moldability and dimensional stability of the PBX, and also desensitize the PBX to external stimuli. As the polymer material, polyurethane (PUR) based on polybutadiene, polyester, and polyether has been used.

In the PBX, a PUR reaction is necessarily required to be delayed so that a PBX slurry does not harden during a process of charging a ballistic body, and especially, when hundreds of shots need to be charged in one batch, it is inevitable to delay the initiation of the PUR reaction in order to ensure sufficient charging operation time for the PBX.

In order to solve this, the development of delayed-action catalysts capable of appropriately adjusting an initiation rate for polyurethane polymerization and reaction rate of PUR is urgently required, but up to date, rather than studies on preparation of PBX slurry, studies on delayed-action PUR catalysts are being actively conducted in various application fields such as coatings, elastomers, or the like, and in the case of catalyst supporting technique, studies are being conducted to improve catalytic activity by supporting general metal catalysts or transition metal catalysts on metal oxides or inorganic oxides.

Therefore, the development of a catalyst capable of adjusting a reaction rate during a polyurethane reaction or a catalyst system capable of adjusting a desired pot life and curing rate by adjusting a reaction rate of polyurethane is required.

SUMMARY

An objective of the present invention in consideration of the above points is to provide a catalyst-supporting organic-inorganic hybrid composite particle and a method of preparing the same, the catalyst-supporting organic-inorganic hybrid composite particle capable of ensuring a suitable pot life and curing reaction rate by adjusting an initiation rate for polyurethane polymerization through a rate at which a reaction catalyst is released from the catalyst-supporting organic-inorganic hybrid composite particle and an amount of the reaction catalyst released when catalyst-supporting organic-inorganic hybrid composite particles on which a polyurethane reaction catalyst is supported are mixed with a mixture used to prepare polyurethane.

In order to achieve the above objective, a method of preparing a catalyst-supporting organic-inorganic hybrid composite particle of the present invention includes preparing a catalyst-supporting particle by mixing and reacting an alkoxy silane-functionalized polyurethane precursor represented by Chemical Formula 1 described below with tetraethyl orthosilicate, and preparing the catalyst-supporting organic-inorganic hybrid composite particle by supporting a catalyst on the catalyst-supporting particle.

The preparing of the catalyst-supporting particle may include a mixture preparation operation of preparing a mixture by dissolving the alkoxy silane-functionalized polyurethane precursor and the tetraethyl orthosilicate in a solvent, and a catalyst-supporting particle preparation operation of preparing the catalyst-supporting particle by adding dropwise an aqueous acid solution into the mixture and allowing reaction to take place.

In the mixture preparation operation, it is preferable to mix the alkoxy silane-functionalized polyurethane precursor with the tetraethyl orthosilicate in a weight ratio of 1:1 to 1:10.

Preferably, the solvent may include at least one selected from among methanol, ethanol, propanol, isopropanol, and butanol.

In the catalyst-supporting particle preparation operation, it is preferable to prepare the catalyst-supporting particle by mixing the aqueous acid solution with the mixture at 30° C. to 80° C. for 12 hours to 72 hours while the aqueous acid solution is added dropwise into the mixture.

Preferably, the catalyst may be one selected from among dibutyltin dilaurate, stannous octoate, 1,4-diazabicyclo[2.2.2]octane, triphenyl bismuth, tris(ethoxyphenyl)bismuth, ferric acetylacetonate, tetramethyl-1,4-benzenediamine, trietylenediamine, potassium octoate, and zine octoate.

Also, in order to achieve the above objective, a catalyst-supporting organic-inorganic hybrid composite particle of the present invention includes a catalyst-supporting particle as a support element consisting of an alkoxy silane-functionalized polyurethane precursor and tetraethyl orthosilicate, and a catalyst supported on the catalyst-supporting particle.

The alkoxy silane-functionalized polyurethane precursor, the catalyst-supporting particle, and the like constituting the catalyst-supporting organic-inorganic hybrid composite particle are the same as described above.

Advantageous Effects

A method of adjusting a polyurethane reaction rate using a catalyst-supporting organic-inorganic hybrid composite particle of the present invention involves adding a certain amount of catalyst-supporting organic-inorganic hybrid composite particles to a mixture of polyol and isocyanate and allowing reaction to take place, and in this case, a desired curing rate can be freely adjusted by adjusting the catalyst-supporting organic-inorganic hybrid composite particles.

Thus, by using the method of adjusting a polyurethane reaction rate, workability can be improved by extending a pot life and adjusting a curing rate according to working conditions in the universally used polyurethane reaction.

BRIEF DESCRIPTION OF DRAWINGS

In order that the disclosure may be well understood, there will now be described various forms thereof, given by way of example, reference being made to the accompanying drawings, in which.

DETAILED DESCRIPTION

In this specification, terms such as "consist of", "include" or "added" should not be construed as necessarily including all of the various constituent elements or various operations described in the specification, and should be construed that some constituent elements or some operations among them may not be included and may further include additional constituent elements or operations.

Hereinafter, embodiments of the present invention will be described in detail with reference to the accompanying drawings, and because these embodiments are examples and are implemented in various different forms by one of ordinary skill in the art to which the present invention pertains, the present invention is not limited to the embodiments described herein.

Figure 1:
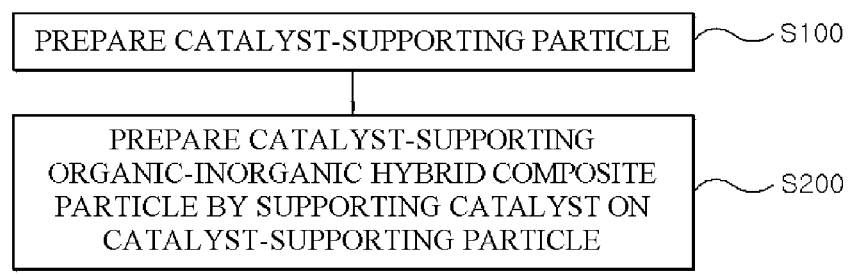
FIGS. 1 and 2 are each a schematic flow chart of a method of preparing a catalyst-supporting organic-inorganic hybrid composite particle of the present invention.

A method of preparing a catalyst-supporting organic-inorganic hybrid composite particle of the present invention includes, as shown in FIG. 1, a catalyst-supporting particle preparation operation (S100) and a catalyst-supporting organic-inorganic hybrid composite particle preparation operation (S200).

In the catalyst-supporting particle preparation operation (S100), an alkoxy silane-functionalized polyurethane precursor (hereinafter, referred to as AFPP) and tetraethyl orthosilicate (hereinafter, referred to as TEOS) are mixed and reacted together to thereby prepare a catalyst-supporting particle.

Figure 2:
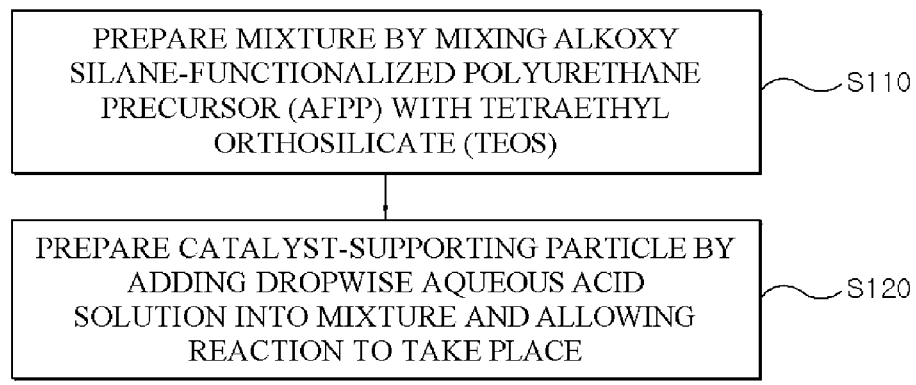

As shown in FIG. 2, in the catalyst-supporting particle preparation operation (S100), a mixture preparation operation (S110) of preparing a mixture by mixing the AFPP with the TEOS and a catalyst-supporting particle preparation operation (S120) of preparing the catalyst-supporting particle by adding dropwise an aqueous acid solution into the mixture and allowing reaction to take place may be performed in this stated order.

The alkoxy silane-functionalized polyurethane precursor may be represented by Chemical Formula 1 below.

[Chemical Formula 1]

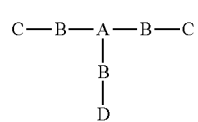

In Chemical Formula 1, A includes a hydrophobic segment and three or more hydroxy groups, B includes two or more isocyanate groups, C includes both a hydroxy group and an alkoxy silane group or both an amine group and an alkoxy silane group, and D includes a hydrophilic segment and two or more hydroxy groups.

For example, an exemplary compound corresponding to each of A, B, C, and D in Chemical Formula 1 may be compounds represented by one of Chemical Formulae 2 to 18 below.

Preferably, A in Chemical Formula 1 may be one of glycerol such as Chemical Formula 2 below and a polypropylene triol such as Chemical Formula 3 below.

[Chemical Formula 2]

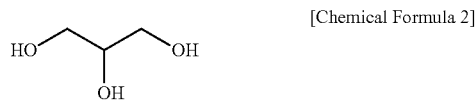

[Chemical Formula 3]

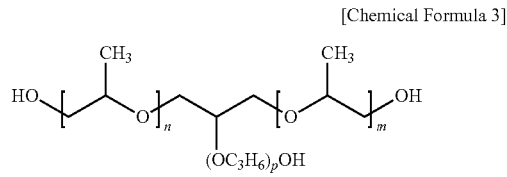

In Chemical Formula 3, m is an integer from 1 to 50, n is an integer from 0 to 50, and p is an integer from 0 to 50.

Preferably, B in Chemical Formula 1 may be one of 2,4-toluene diisocyanate such as Chemical Formula 4 below, 2,6-toluene diisocyanate such as Chemical Formula 5 below, isophorone diisocyanate such as Chemical Formula 6 below, methylene diisocyanate such as Chemical Formula 7 below, 4,4'-methylene diphenyl diisocyanate such as Chemical Formula 8 below, hexamethylene diisocyanate such as Chemical Formula 9 below, xylene diisocyanate such as Chemical Formula 10 below, and tolidine diisocyanate such as Chemical Formula 11 below.

[Chemical Formula 4]

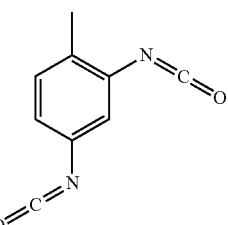

[Chemical Formula 5]

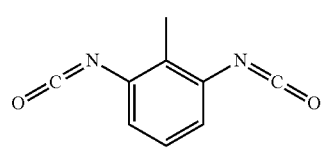

[Chemical Formula 6]

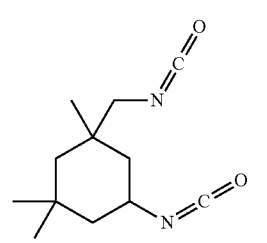

[Chemical Formula 7]

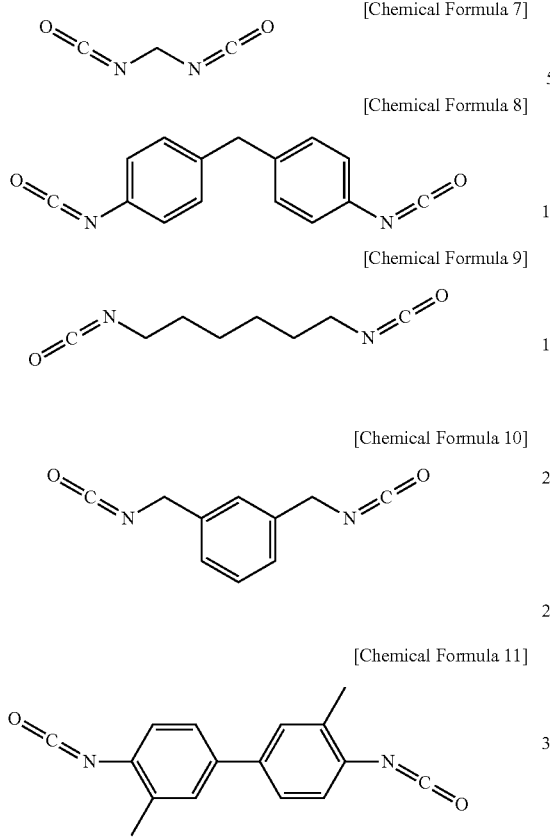

[Chemical Formula 8]

[Chemical Formula 9]

[Chemical Formula 10]

[Chemical Formula 11]

Preferably, C in Chemical Formula 1 may be one of methoxy(polyethyleneoxy)propyl trimethoxysilane such as Chemical Formula 12 below, hydroxymethyl triethoxysilane such as Chemical Formula 13 below, aminopropyltriethoxysilane such as Chemical Formula 14 below, bis(trimethoxysilylpropyl)amine such as Chemical Formula 15 below, (3-glycidoxypropyl)trimethoxysilane such as Chemical Formula 16 below, [2-(3,4-epoxycyclohexyl)ethyl]trimethoxysilane such as Chemical Formula 17 below.

[Chemical Formula 12]

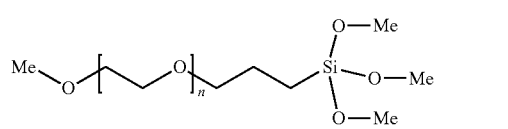

In Chemical Formula 12, n is an integer from 1 to 50, and Me is a methyl group.

[Chemical Formula 13]

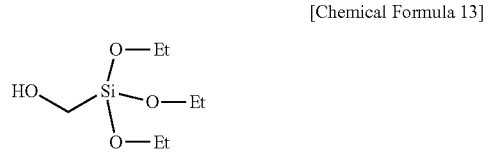 [SMILES: CCO[Si](CO)(OCC)OCC]

In Chemical Formula 13, Et is an ethyl group.

[Chemical Formula 14]

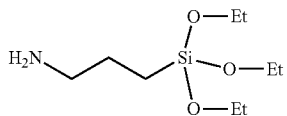

In Chemical Formula 14, Et is an ethyl group.

[Chemical Formula 15]

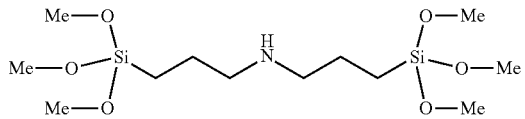

In Chemical Formula 15, Me is a methyl group.

[Chemical Formula 16]

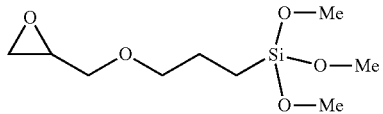

In Chemical Formula 16, Me is a methyl group.

[Chemical Formula 17]

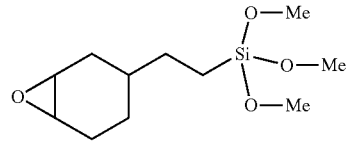

In Chemical Formula 17, Me is a methyl group.

Preferably, D in Chemical Formula 1 may be polyethylene glycol such as Chemical Formula 18 below.

[Chemical Formula 18]

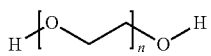

In Chemical Formula 18, n is an integer from 1 to 50.

In the AFPP represented by Formula 1, a hydroxyl group of A and one isocyanate group of B are reacted with each other to form a urethane bond, and the other and a hydroxyl group or an amine group are reacted with each other to form a urethane bond or a urea bond.

Figure 3:
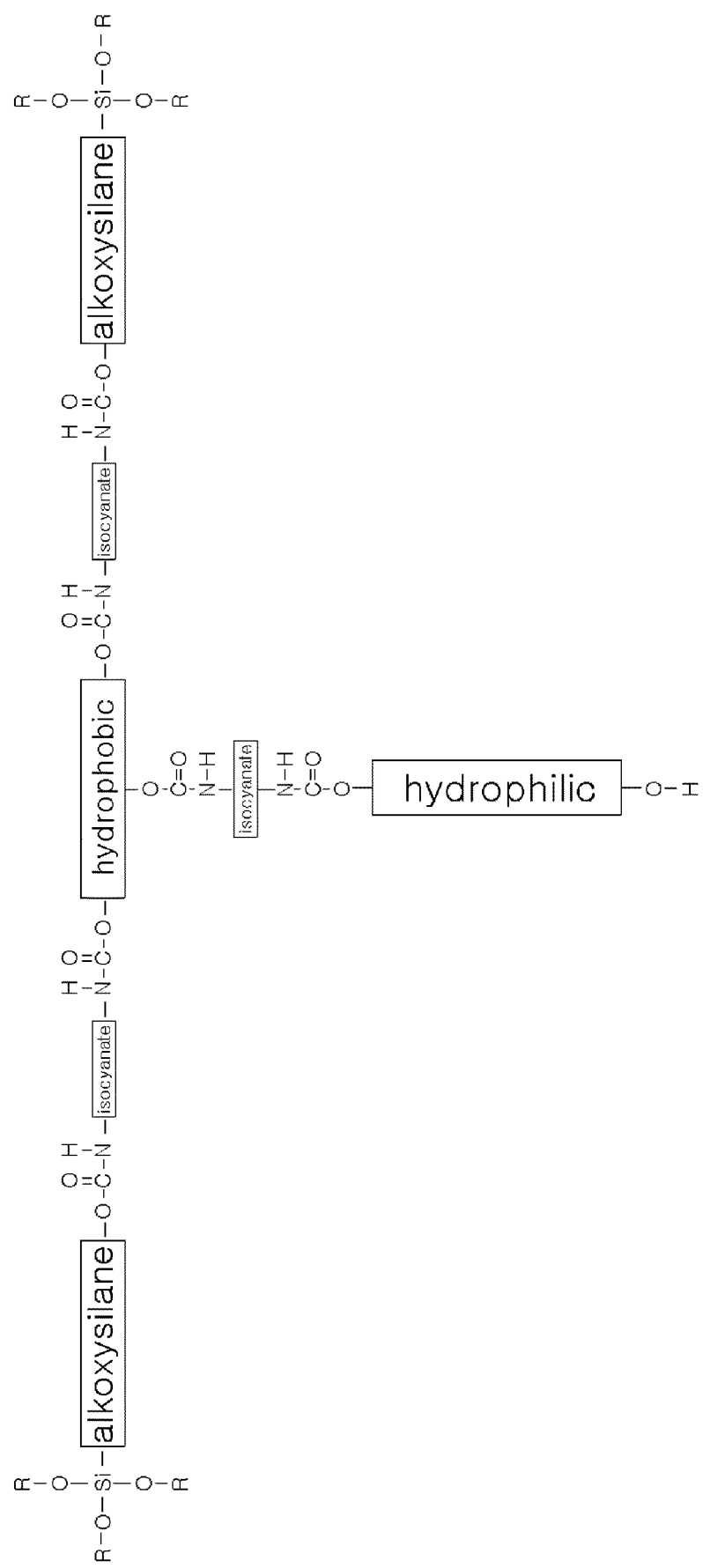
FIGS. 3 and 4 are each a schematic diagram of an alkoxy silane-functionalized polyurethane precursor of the present invention.
Figure 4:
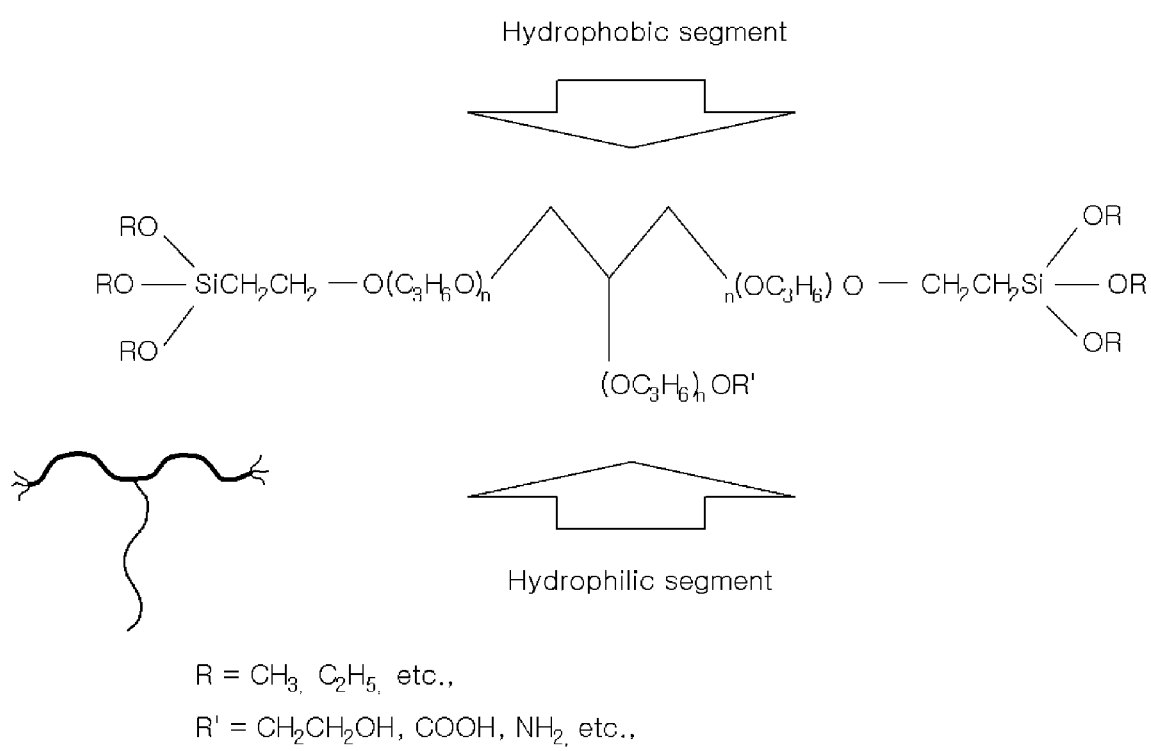

FIGS. 3 and 4 are schematic views of the AFPP of the present invention, and preferably, the AFPP represented as shown in FIGS. 3 and 4 may be used, but is not necessarily limited thereto.

In the chemical formula of the AFPP shown in FIG. 4, R is a linear or branched unsaturated hydrocarbon having 1 to 40 carbon atoms, R' is a hydroxyl group (—OH) such as an ethanol group (—CH2CH2OH), an amino group (—NH2), a carboxyl group (—COOH), and the like, and n refers to a natural number from 1 to 20.

In the mixture preparation operation (S110), it is preferable that the AFPP and the TEOS are mixed in a solvent in a weight ratio of 1:1 to 1:10, and when the AFPP and the TEOS are out of the proposed mixing ratio, a prepared catalyst-supporting particle may not support a catalyst and may be destroyed.

The solvent used in the mixture preparation operation (S110) may include at least one selected from among methanol, ethanol, propanol, isopropanol, and butanol, each capable of dissolving silane and silica, and preferably, may include the ethanol.

In the catalyst-supporting particle preparation operation (S120), while the aqueous acid solution is added dropwise into the prepared mixture, the aqueous acid solution and the mixture are mixed at 30° C. to 80° C. for 12 hours to 72 hours, and thus, the catalyst-supporting particle may be prepared.

The aqueous acid solution is not limited and may preferably be an aqueous hydrochloric acid solution, and a concentration thereof may be 0.1 M to 1 M.

After the catalyst-supporting particle preparation operation (S120), the catalyst-supporting particle formed in a reaction solution may be recovered by filtration, and a drying process using a drier may be further included.

In the catalyst-supporting organic-inorganic hybrid composite particle preparation operation (S200), a catalyst is supported on the catalyst-supporting particle prepared through the catalyst-supporting particle preparation operation (S100) to thereby prepare a catalyst-supporting organic-inorganic hybrid composite particle.

The catalyst supported on the catalyst-supporting particle in the catalyst-supporting organic-inorganic hybrid composite particle preparation operation (S200) may include at least one selected from among dibutyltin dilaurate (DBTDL), stannous octoate, 1,4-diazabicyclo [2.2.2]octane (DABCO), triphenyl bismuth, tris (ethoxyphenyl) bismuth, ferric acetylacetonate, tetramethyl-1,4-benzenediamine (TMBDA), trietylenediamine, potassium octoate, and zinc octoate.

Hereinafter, the configuration and effect of the catalyst-supporting organic-inorganic hybrid composite particles will be described in more detail through exemplary embodiments of the present invention.

Components and amounts described in Table 1 were used for mixing, thereby preparing a catalyst-supporting particle.

In detail, the AFPP and the TEOS in the amounts as in Table 1 below were dissolved in 60 g of ethanol, and then 15 g of 0.1 mol aqueous hydrochloric acid solution was added dropwise thereto, followed by hydrolysis and condensation reaction while mixing at 60° C. for 48 hours, to thereby prepare a catalyst-supporting particle.

Polypropylene triol and 2,4-toluene diisocyanate were stirred and reacted at about 70° C. for 4 hours at a reaction molar ratio of 1:3 in a nitrogen atmosphere to thereby obtain a compound, to which methoxy(polyethyleneoxy)propyltrimethoxysilane was added in a 1:1 reaction molar ratio, followed by stirring and reacting again to thereby obtain a compound, to which polyethylene oxide each having a number average molecular weight of 600 was added in a molar ratio of 1, followed by stirring and reacting to thereby synthesize a compound, which was used as the AFPP used in embodiments as shown in Table 1 below.

TABLE 1

| Name of catalyst-supporting particle | AFPP (g) | TEOS (g) | Ethanol (g) | HCl (g) |
|---|---|---|---|---|
| AT-1 | 6 | 6 | 60 | 15 |
| AT-3 | 6 | 18 | 60 | 15 |

TABLE 1-continued

| Name of catalyst-supporting particle | AFPP (g) | TEOS (g) | Ethanol (g) | HCl (g) |
|---|---|---|---|---|
| AT-5 | 6 | 30 | 60 | 15 |
| AT-8 | 6 | 48 | 60 | 15 |
| AT-10 | 6 | 60 | 60 | 15 |

As described above, AFPP and TEOS are mixed in various weight ratios to thereby prepare a catalyst-supporting particle, to which dibutyltin dilaurate (DBTDL) as a catalyst is added and mixed with the catalyst-supporting particle for a certain period of time, thereby preparing a catalyst-supporting organic-inorganic hybrid composite particle in which the catalyst is supported on the catalyst-supporting particle according to embodiments disclosed hereinafter.

In a first embodiment as an embodiment, "AT-1-D" as a catalyst-supporting organic-inorganic hybrid composite particle, in which a DBTDL catalyst was supported on AT-1 as a catalyst-supporting particle prepared having a weight ratio of AFPP to TEOS of 1:1, was prepared.

In a second embodiment as another embodiment, "AT-3-D" as a catalyst-supporting organic-inorganic hybrid composite particle, in which a DBTDL catalyst was supported on AT-3 as a catalyst-supporting particle prepared having a weight ratio of AFPP to TEOS of 1:3, was prepared.

In a third embodiment as another embodiment, "AT-5-D" as a catalyst-supporting organic-inorganic hybrid composite particle, in which a DBTDL catalyst was supported on AT-5 as a catalyst-supporting particle prepared having a weight ratio of AFPP to TEOS of 1:5, was prepared.

In a fourth embodiment, "AT-8-D" as a catalyst-supporting organic-inorganic hybrid composite particle, in which a DBTDL catalyst was supported on AT-8 as a catalyst-supporting particle prepared having a weight ratio of AFPP to TEOS of 1:8, was prepared.

In a fifth embodiment, "AT-10-D" as a catalyst-supporting organic-inorganic hybrid composite particle, in which a DBTDL catalyst was supported on AT-10 as a catalyst-supporting particle prepared having a weight ratio of AFPP to TEOS of 1:10, was prepared.

Figure 5:
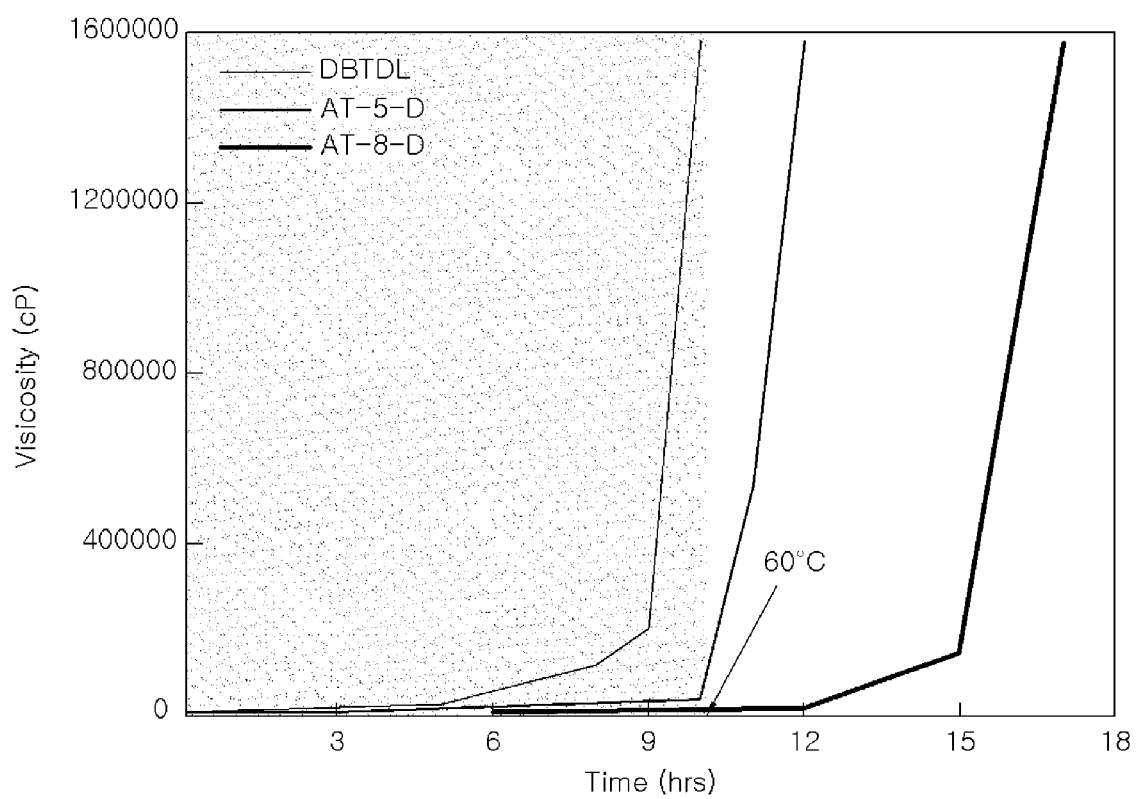
FIG. 5 is a graph of a result of a polyurethane reaction rate according to the type of a catalyst-supporting organic-inorganic hybrid composite particle prepared according to an embodiment of the present invention.

In order to compare a reaction rate of polyurethane for each catalyst-supporting organic-inorganic hybrid composite particle prepared according to the above embodiments, while the catalyst-supporting organic-inorganic hybrid composite particle was added to a mixture of polyol and isocyanate and mixed with the mixture, a viscosity measurement value (cP) was measured, and results are shown in FIG. 5.

As shown in FIG. 5, it was confirmed that within an hour to two hours after a temperature was raised to 60° C., a viscosity of AT-5-D, which had a pot life of 10 hours at room temperature of 15° C. to 30° C., was rapidly increased due to a polyurethane reaction, and AT-8-D, which was not reactive at room temperature, also had a pot life of 10 hours at room temperature and it was two hours later after a temperature was raised to 60° C. that a viscosity of AT-8-D was rapidly increased and thus a polyurethane reaction started.

Thus, it may be seen that a pot life may be adjusted from an hour to 25 hours at a temperature of 60° C. according to the type of the catalyst-supporting organic-inorganic hybrid composite particle prepared in an embodiment of the present invention, and a desired curing rate may be freely adjusted so that a rapid curing rate may occur within an hour to two hours after stirring at room temperature for 10 hours.

The specific embodiments described above are merely exemplary implementations, and are not limited by the above-described embodiments and the accompanying drawings. Therefore, various visible substitutions and changes are possible without departing from the technical spirit of the invention.

The invention claimed is:

1. A method of preparing a catalyst-supporting organic-inorganic hybrid composite particle, the method comprising:
preparing a catalyst-supporting particle by mixing and reacting an alkoxy silane-functionalized polyurethane precursor represented by Chemical Formula 1 below with tetraethyl orthosilicate; and
preparing the catalyst-supporting organic-inorganic hybrid composite particle by supporting a catalyst on the catalyst-supporting particle,

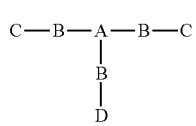

[Chemical Formula 1]

wherein, in Chemical Formula 1, A comprises a hydrophobic segment and three or more hydroxy groups, B comprises two or more isocyanate groups, C comprises both a hydroxy group and an alkoxy silane group or both an amine group and an alkoxy silane group, and D comprises a hydrophilic segment and two or more hydroxy groups,
wherein A in Chemical Formula 1 is a polypropylene triol represented by Chemical Formula 3 below:

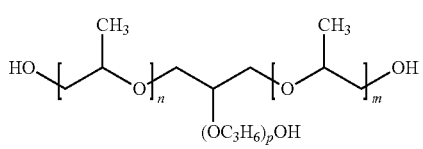

[Chemical Formula 3]

in Chemical Formula 3, m is an integer from 1 to 50, n is an integer from 0 to 50, and p is an integer from 0 to 50,
wherein B in Chemical Formula 1 is 2,4-toluene diisocyanate represented by Chemical Formula 4 below:

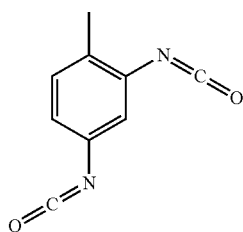

[Chemical Formula 4]

wherein C in Chemical Formula 1 is methoxy (polyethyleneoxy) propyl trimethoxysilane represented by Chemical Formula 12 below:

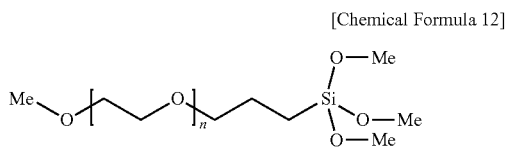

[Chemical Formula 12]

in Chemical Formula 12, n is an integer from 1 to 50, and Me is a methyl group, wherein D in Chemical Formula 1 polyethylene glycol represented by Chemical Formula 18 below:

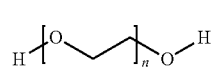

[Chemical Formula 18]

in Chemical Formula 18, n is an integer from 1 to 50,
wherein the preparing of the catalyst-supporting particle comprises:
preparing a mixture by dissolving the alkoxy silane-functionalized polyurethane precursor and the tetraethyl orthosilicate in a solvent; and
preparing the catalyst-supporting particle by adding dropwise an aqueous acid solution into the mixture and allowing reaction to take place,
wherein the preparing of the mixture comprises mixing the alkoxy silane-functionalized polyurethane precursor with the tetraethyl orthosilicate in a weight ratio of 1:5 to 1:8.

2. The method of claim 1, wherein the solvent comprises at least one selected from among methanol, ethanol, propanol, isopropanol, and butanol.

3. The method of claim 1, wherein the preparing of the catalyst-supporting particles comprises preparing the catalyst-supporting particle by adding dropwise an aqueous acid solution into the mixture and then allowing the reaction to proceed at 30° C. to 80° C. for 12 hours to 72 hours.

4. The method of claim 1, wherein the catalyst is dibutyltin dilaurate.

* * * * *